Dec. 23, 1930.  G. W. GREENE  1,786,342
FISH NET
Filed Nov. 8, 1929   2 Sheets-Sheet 1
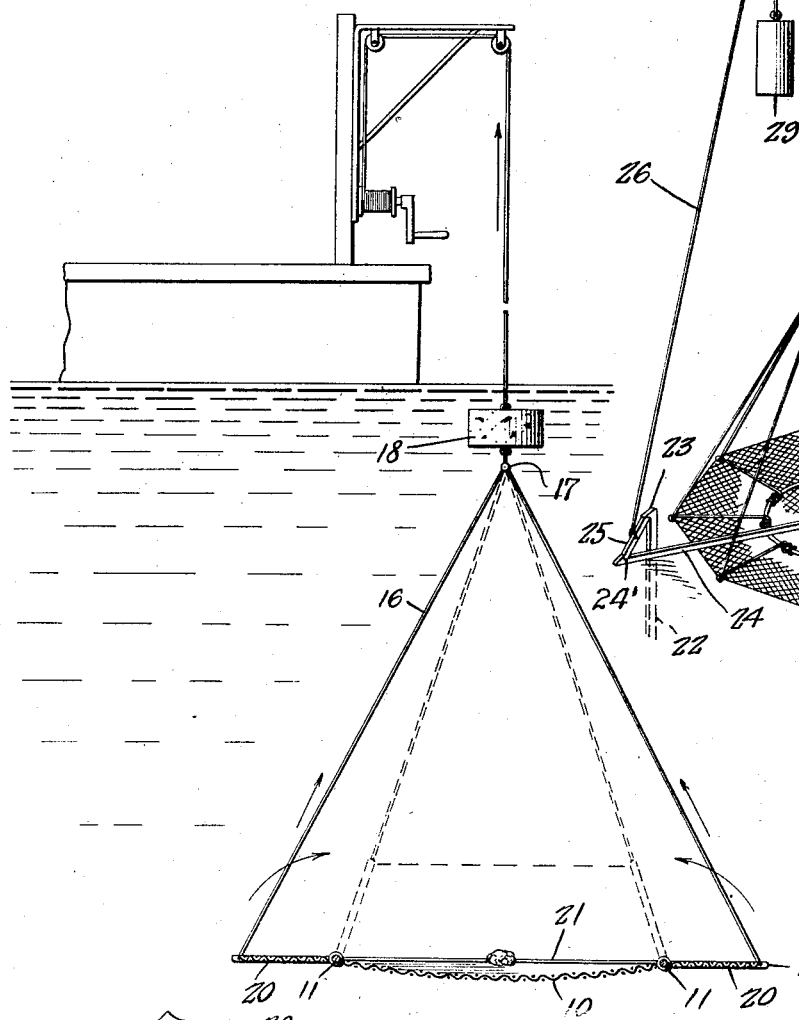
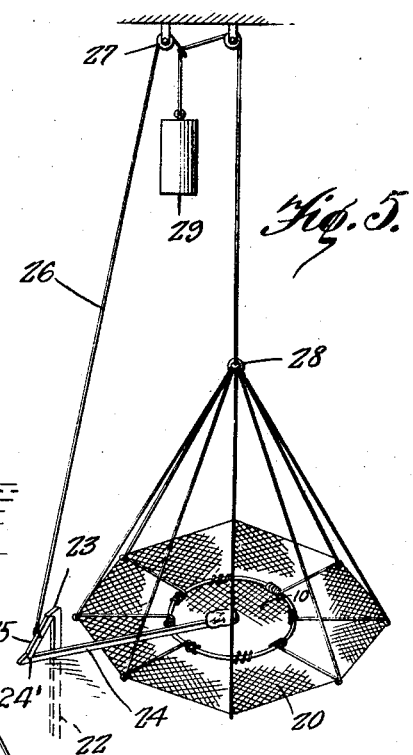
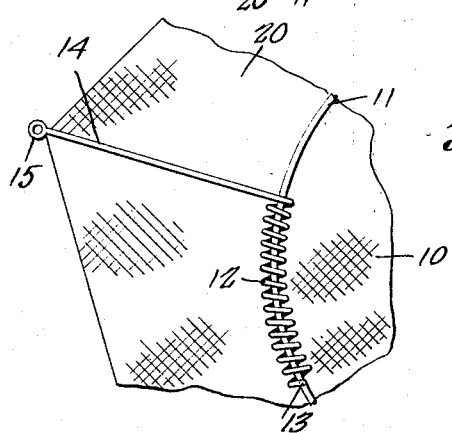
GEORGE W. GREENE,
INVENTOR
BY Victor J. Evans
ATTORNEY Dec. 23, 1930.  G. W. GREENE  1,786,342
FISH NET
Filed Nov. 8, 1929   2 Sheets-Sheet 2

GEORGE W. GREENE, INVENTOR
BY Victor J. Evans
ATTORNEY

Patented Dec. 23, 1930

1,786,342

UNITED STATES PATENT OFFICE

GEORGE W. GREENE, OF HAMARVILLE, PENNSYLVANIA

FISH NET

Application filed November 8, 1929. Serial No. 405,827.

This invention relates to traps and more particularly to that form of trap in the nature of a net for catching game in live state.

An object of the invention consists in the provision and arrangement of a net of this character having reinforcing means whereby the net will be automatically spread out when lowered upon a surface.

Another object of the invention embodies the provision of lifting members for the net and reinforcing means therefor.

An additional object of the invention contemplates yielding connections between the reinforcing means and lifting members whereby the latter will be normally extended outwardly from the net in a plane therewith.

More specifically stated the lifting members are provided with a netting whereby the catch within the net will be held against escape.

With the above and other objects in view, the invention further consists of the following novel features and details of construction, to be hereinafter more fully described, illustrated in the accompanying drawings and pointed out in the appended claim.

In the drawings:

Figure 1 is an elevation of the present invention illustrating by full and dotted line positions the method employed in the catching of fish.

Fig. 2 is an enlarged fragmentary top plan view of the invention illustrative of the connection of the reinforcing means and lifting members.

Figure 5 is a perspective view of a snare construction set up for use in conjunction with the present invention to catch animals, birds and the like.

Figure 3:
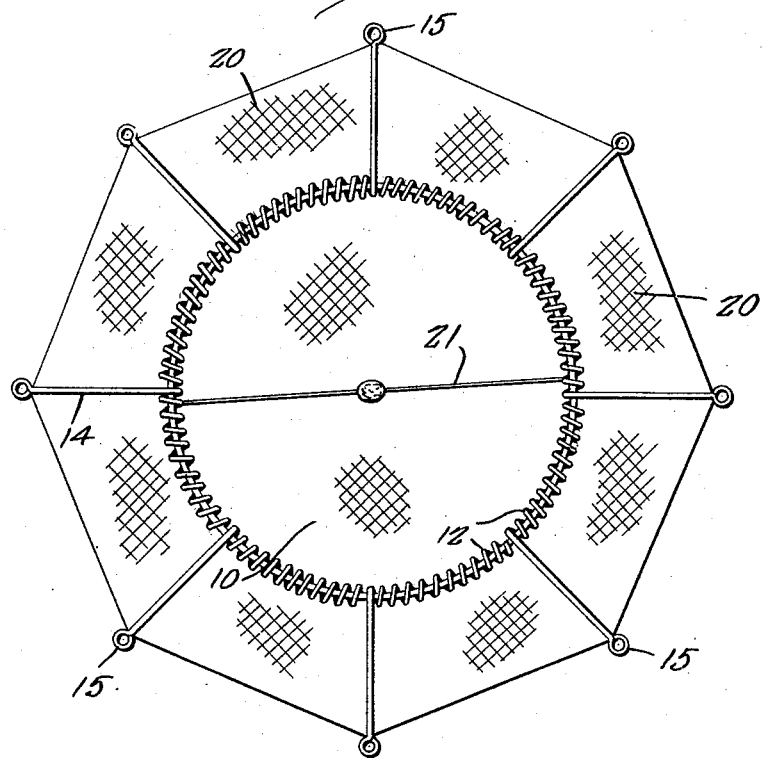
Figure 3 is a top plan view of the invention in position for use.

Referring to the drawings in detail wherein like characters of reference denote corresponding parts, the reference character 10 indicates generally a form of net composed of any suitable material and of any desired mesh. A rod or reinforcing element, such as indicated at 11 and of continuous circular formation, is joined at appropriate points in the length thereof with the net 10.

Spring elements of the coil type encircling the reinforcing element or rod 11 in the manner suggested in Figures 2 and 3 of the drawings are anchored or rigidly connected, as at 13, to the reinforcing element 11 whereas lifting bars or arms 14 are extended as continuations of the opposed end convolutions thereof. Eyes 15 are formed in the outermost projecting extremities of the lifting arms 14 through which guy ropes 16 may be passed and fastened. The guy ropes are connected at their opposite and uppermost ends with a common loop 17 preferably arranged immediately beneath a form of float indicated at 18. A length of netting 20 is also connected with the reinforcing element 11 and the lifting arms 14 whereby side wall portions are provided for the net or trap when same is elevated or otherwise withdrawn from the water. A bait carrying rod 21 having connection at its ends with diametrically opposite portions of the reinforcing element 11 carries bait at an intermediate point in its length immediately above the surface of the net 10.

As understood from the Figure 1 illustration, a form of derrick construction may be employed upon the stern of a boat or upon a wharf or landing to raise the net at intervals to inspect the condition of the bait and to empty the fish, crabs, lobsters and other inhabitants of the water lured by the form of bait employed.

Figure 4:
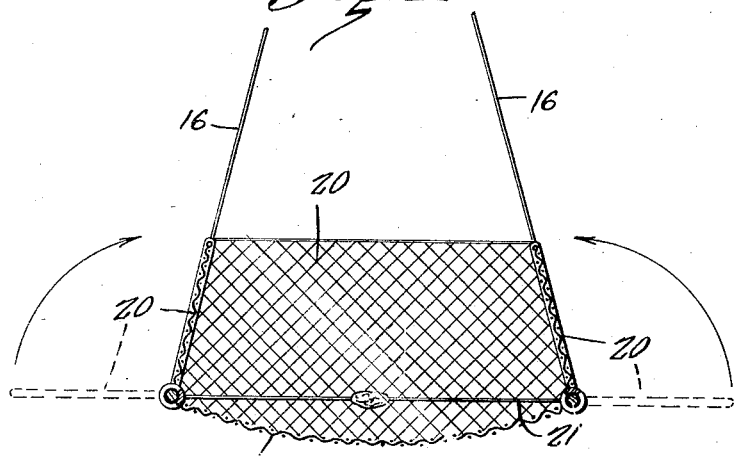
Figure 4 is a view similar to Figure 1 with the lifting members raised in conjunction with the netting therefor to enclose and prevent the escape of the catch within the net proper.

Although I have shown and described my invention as being primarily designed for use in the catching of fish and other inhabitants of the water it is obviously apparent that the form of trap can be effectively used in conjunction with a snare and figure 4 trigger mechanism to catch wild animals alive.

The spring elements 12 anchored at one of their ends upon the reinforcing element 11 exercise tension at their opposite ends upon the lifting arms 14 in an outward and downward direction whereby the trap and net sections will automatically spread out and be lowered in position for use. The tension of the springs, however, is not sufficient to overcome the lifting action and will allow the lifting arms 14 to swing with relation to the reinforcing element to occupy the figure 4 position.

The Figure 5 illustration embodies the same form of net, reinforcing element, netting, lifting arms and guy ropes as employed in the preferred form but the means for elevating the net is more adapted for the catching of animals and birds. For this reason, it is necessary to obviate the derrick construction and to employ the figure 4 snare arrangement which comprises a standard 22 driven into the ground an appreciable distance and which is provided with a lug or projection 23 horizontally disposed adjacent its uppermost end. A bait or fruit stick 24 of elongated formation having a portion adjacent one end lying flush against one side of the standard 22 is notched, as at 24', upon its upper surface to accommodate the adjacent pointed end of a trigger member 25. The opposite end of the trigger member is engageable with the lug or projection 23. A pull rope 26 having connection at one end with the intermediate portion of the trigger member 25 is passed over spaced pulley wheels 27 and subsequently connected with a ring 28 from which the guy wires of the net are extended. A weight member 29 having connection with that portion of the pull rope 26 between the spaced pulley wheels 27 will descend and elevate the trap upon the occasion of the figure 4 trap mechanism being released or set off.

Although the figure 4 snare release mechanism has been set forth as the means for releasing and catching the bird or animal, it is obviously understood that other forms of snare arrangements and trigger release mechanisms may be employed to advantage without departing from the spirit of the present invention.

The invention is susceptible of various changes in its form, proportions and minor details of construction and the right is herein reserved to make such changes as properly fall within the scope of the appended claim.

Having described the invention, what is claimed is:—

An automatic trap comprising a net having a continuous reinforcing element secured circumferentially thereof, spring elements disposed at intervals and encircling the reinforcing element, lifting arms carried by and extended as continuations of the spring elements and normally induced thereby to occupy positions in a plane with the net and reinforcing element, a netting carried upon the outer portion of the reinforcing element and extended for connection with the lifting arms, a bait carrying element having one end disposed above the net and a weight operated release mechanism operatively engaged with the opposite end of the weight carrying element.

In testimony whereof I affix my signature.
GEORGE W. GREENE.